UNITED STATES PATENT OFFICE.

GEORGE H. GOODWIN, OF BOSTON, AND GEORGE W. SEAVERNS, OF LAWRENCE, MASS.; SAID SEAVERNS ASSIGNOR TO SAID GOODWIN.

IMPROVEMENT IN COMPOSITIONS FOR FILLING THE FIBERS OF PAPER.

Specification forming part of Letters Patent No. 161,778, dated April 6, 1875; application filed April 1, 1874.

*To all whom it may concern:*

Be it known that we, GEORGE H. GOODWIN, of Boston, in the county of Suffolk and State of Massachusetts, and GEORGE W. SEAVERNS, of Lawrence, in the county of Essex and State aforesaid, have invented a new and useful Improvement of the Art of Paper-Making, whereby the filling of the fibers is cheapened; and we do hereby declare that the following description of the same, and of the manner and process of making, compounding, and using it, is in sufficiently full, clear, concise, and exact terms as to enable any person skilled in the art of paper-making to make, apply, compound, and use the same.

In the manufacture of paper, in which the fibers are filled by a white mineral matter for surfacing, it has been usual heretofore to employ what is known as Silesian white, an imported sulphate of calcium, very free from impurities, and probably anhydrous. This is used in combination with alum and starch in the pulping-engines. Its density is such that if well and constantly stirred it will readily mix with the fibers, and cling to them. If not strongly stirred, it sometimes settles out of the pulp, and this makes trouble. It is an expensive article. All attempts heretofore made to introduce carbonate of calcium as the fiber-filling material have been unsuccessful. One reason for this is probably its greater density, and another the difficulty of getting it sufficiently free from impurities of iron, &c.

In R. H. Collyer's English patent of March 2 and September 2, 1859, No. 550, there is described a treatment of straw flux and other materials for the manufacture of paper, by soaking in water, triturating, boiling in alkali, washing, and steaming, then bleaching in a solution of chloride of lime, as a preparation of stock for the pulping-engine. After describing the bleaching process he says: "I treat the bleached material with dilute sulphuric acid and with carbonate of lime, using the sulphuric acid (about one per cent.) to remove the latent and excessive chlorine, instead of washing it out, and using the carbonate of lime to neutralize the excess of acid." Neither in purpose, in process, nor in time of application is this treatment like ours, as will be seen by considering the following description of the invention:

Our invention consists in the discovery of a way to use the carbonate of calcium, and is the result of a discovery that an article on the market called "Diamond-White" is a very pure carbonate of calcium, practically free from iron and most other impurities; and it may be briefly stated to be the partial conversion of the particles of carbonate into sulphate, in the presence of the dissolved starch and alum, whereby the filling composition is rendered kindly to mix and buoyant in presence of the nascent carbonic acid.

It is probable, though not certain, that in the treatment described hereafter of the mechanical mixture of starch, carbonate, and alum, made slightly acid by sulphuric acid, the particles of carbonate are attacked on their surfaces, and, suffering a surface conversion, the whole mass becomes vesicular by evolution of carbonic acid throughout, or the evolution of carbonic acid from the surfaces of the particles gives to them a motion in the mass, which, as in a closed vessel, there is only one direction, unbounded by walls, necessarily results in an upward motion of the particles to some extent. Whatever be the explanation, the fact is, that by use of "Diamond-White" in the pulping-engine, in the manner hereinafter described, as good, or better results are obtained as by the use of Silesian white, at greatly reduced expense.

By the law of equivalent proportions of the chemists, to convert a calcic carbonate to a calcic sulphate would require about an equal weight of commercial oil of vitriol, (S. G. 1.84,) and we should increase the weight of the product more than a third. It will be observed that in the following method of utilizing the carbonate, the proportion of oil of vitriol used is much below this, so that the carbonate can hardly be considered as more than singed or scalded by the acid not cooked.

Take of pure carbonate of calcium, finely pulverized, such as the "Diamond-White" referred to, one thousand pounds; place it in a wooden tank with a hundred gallons of water and thirty pounds of sulphuric acid and twelve pounds of potassic alum. Mix by stirring thoroughly, and add a hundred pounds of starch, and boil by a steam jet. This produces a spongy paste like the beaten whites of eggs, only more glutinous and thicker. The product is shoveled into the pulp-engine, and is then incorporated into the stock.

As before observed the conversion is very imperfect. Not more than fifty pounds of sulphate can exist in the above product. The unconverted carbonate is more dense than Silesian white, and so gives a better and harder surface. Silesian white gives a yellowish cast to paper, while the carbonate herein described, used in the way described, gives a bluish cast, which is preferred.

We do not confine ourselves to the exact proportions above set forth, but may use as much as ten or even twenty per cent. of acid without material injury, and the alum, if an acid alum, may wholly or partly replace the acid. The quantity of starch, too, may vary from five to fifteen per cent. of the carbonate. The use of alum and starch with Silesian white being old, no claim is made for them; but What we do claim is—

A filling for the fibers of paper, consisting of calcic carbonate treated with from three to twenty per cent. of sulphuric acid, substantially as and for the purpose described.

GEO. H. GOODWIN.
GEO. W. SEAVERNS.

Witnesses:
M. BONNEY,
GEO. U. MCFARLIN.